May 1, 1951 D. R. WHITNEY 2,551,480
BALANCING MACHINE
Filed Aug. 7, 1944 4 Sheets-Sheet 1
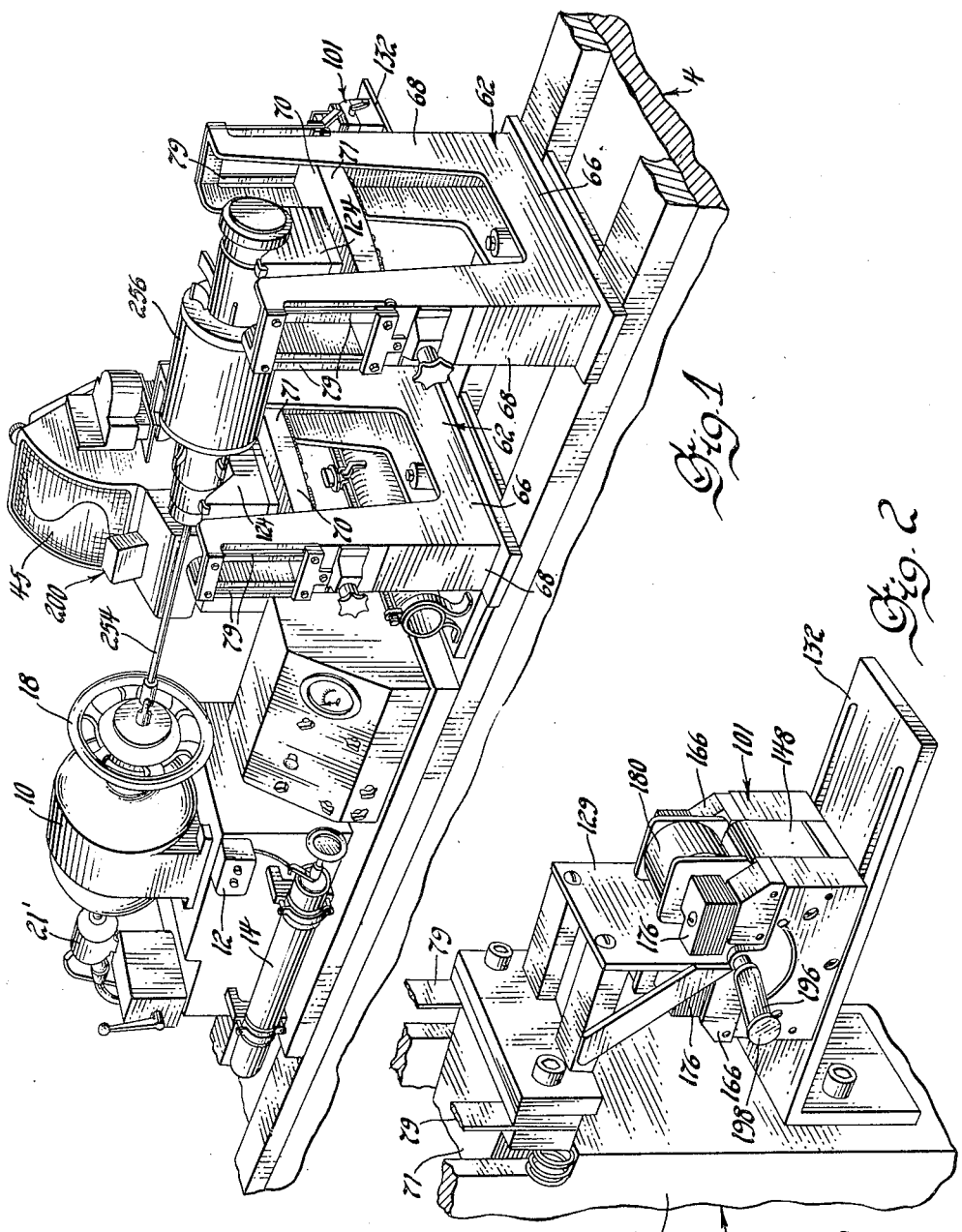
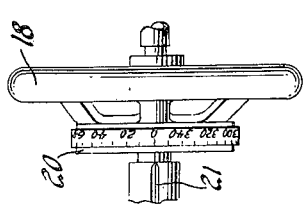
Inventor
Donald R. Whitney
By Blackmore, Spencer & Sliet
Attorneys May 1, 1951 — D. R. WHITNEY — 2,551,480
BALANCING MACHINE
Filed Aug. 7, 1944 — 4 Sheets-Sheet 2

Inventor
Donald R. Whitney
By Blackmore, Sewall & Flint
Attorneys

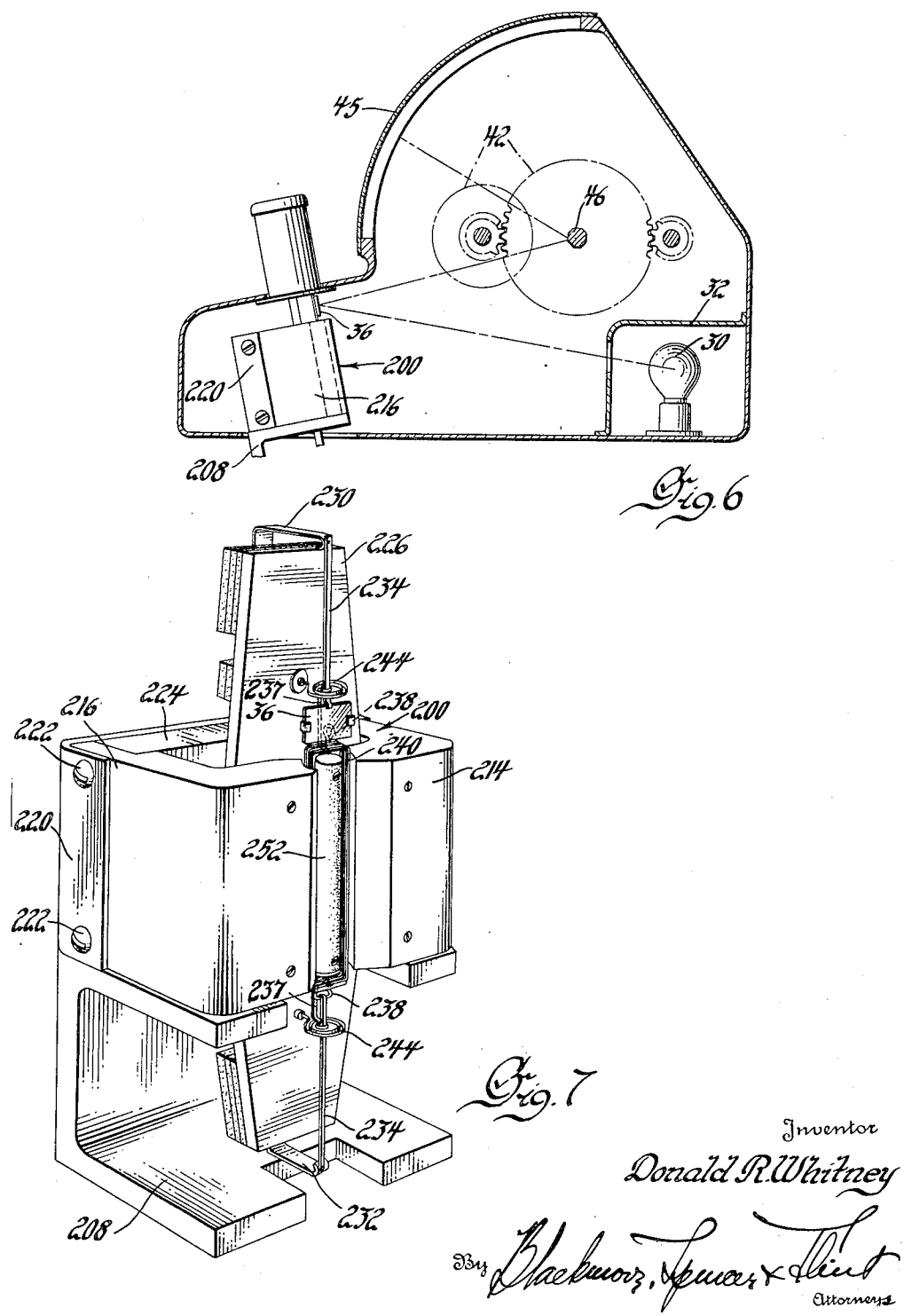

LEFT BRIDGE CIRCUIT RIGHT BRIDGE CIRCUIT

Inventor
Donald R. Whitney
By Blackmor, Spencer & Flint
Attorneys

Patented May 1, 1951

2,551,480

UNITED STATES PATENT OFFICE 2,551,480

BALANCING MACHINE

Donald R. Whitney, Detroit, Mich., assignor to General Motors Corporation, Detroit, Mich., a corporation of Delaware Application August 7, 1944, Serial No. 548,390

3 Claims. (Cl. 73—66)

This invention has to do with a machine for determining the amount and location of unbalance in rotating bodies.

In Patent No. 2,293,371 granted to Thomas C. Van Degrift on August 18, 1942, there is disclosed a balancing machine having an improved indicating mechanism by which there may be obtained readings of unbalance in a selected correction plane at one end of a rotatable body, free from error due to the effects of unbalance existing in a selected correction plane at the other end. In one embodiment of the invention the indicating mechanism comprises a nodal bar arranged to be moved by actuators engaging the body so that, as the body gyrates in response to unbalance, the bar swings back and forth in one plane. As described in detail in said patent, by applying a follower against a nodal point on the bar and providing an indicator actuated by the follower a correct reading of unbalance existing in the correction plane at the corresponding end of the body may be obtained, free from the error mentioned.

While the indicating mechanism just described will be found satisfactory for most purposes, in some installations, particularly in the case of large rotating bodies such as shafts and propellers used in ship propulsion, the nodal bar mechanism may be found to be undesirable because of the difficulty of accurately transmitting vibrations of small amplitude through long and sometimes complicated linkage.

I have found that equally satisfactory results may be obtained by a very simple form of electrical indicating means embodying the following principles of construction: Associated with each end of the rotatable body are devices for producing electrical impulses of a strength in proportion to the gyration of the body in response to unbalance. The impulses so produced are supplied to a common electrical indicating instrument, such as a galvanometer, in such manner as to oppose each other. In order that the resultant reading may correspond to the amount of unbalance in the correction plane at one end of the body only, I have found it necessary to introduce suitable resistance in the circuit of the electrical impulse producing device at the opposite end of the body so that the opposing force will be in direct proportion to the error produced in the reading of the galvanometer were energy supplied to it by the device at the first end only. Provision is made for reversing the arrangement to secure in like manner an accurate reading of unbalance at the opposite end.

In the preferred form of the invention the galvanometer is provided with two coils mounted to pivot as a unit, each coil being in series with one of the impulse producing devices. The coils are arranged so that their magnetic fields oppose each other and the combined unit assumes a position in the fixed magnetic field of the galvanometer determined by the difference in the strength of the impulses supplied to them by the said devices.

The indicating instrument may, if desired, be provided with the usual pointer and dial to give a reading of unbalance, but I have preferred to employ a mirror carried by the galvanometer coil unit, associated with optical indicating means, as described herein, so as to give a sine wave indication on a screen revealing both the amount and angle of unbalance.

The invention also involves details of construction of the mounting for the body being tested, of the electrical impulse producing devices and their mounts, as well as details of circuits and controls therefor which have been found to be especially desirable and may find application in balancing machines having other types of indicating means.

On the drawings:

Figure 1 is a perspective view of the machine.

Figure 1a is a detail view of the dial and hand wheel.

Figure 2 is a detail perspective view of one of the induction pickups.

Figure 6 is a sectional view through the indicator box.

Figure 7 is a perspective view of the galvanometer.

Figure 3:
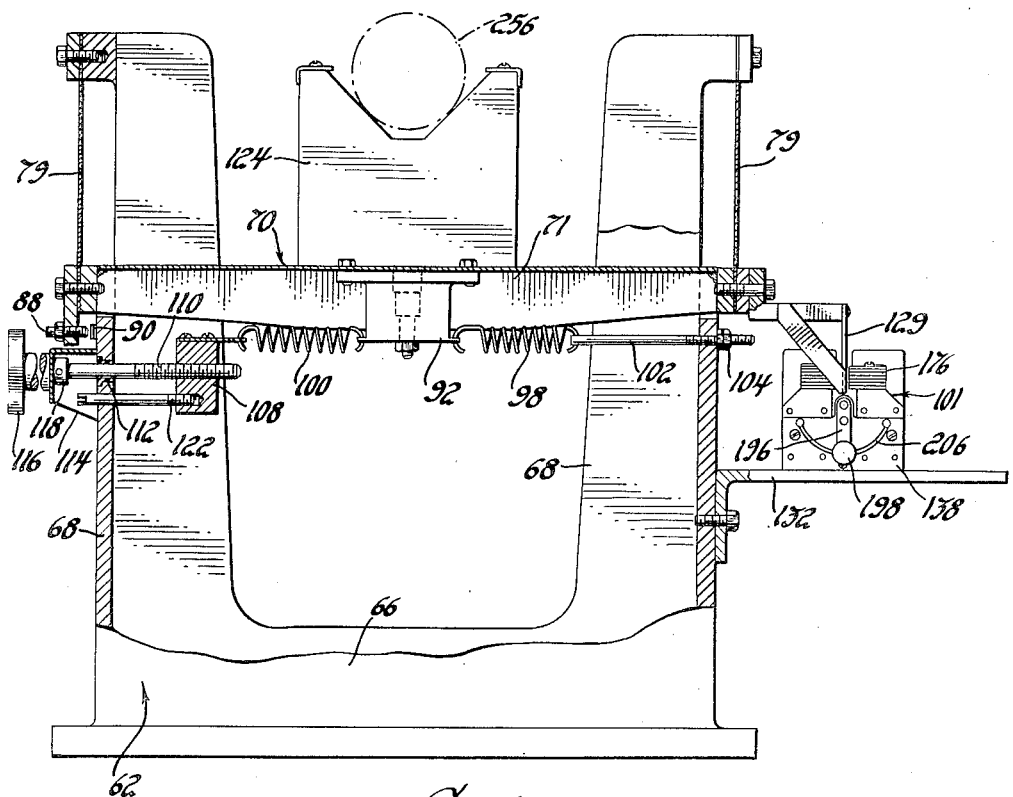
Figure 3 is a transverse sectional view through one of the bearing supports.

As best shown in Figure 1, 4 indicates the base of the machine on which are mounted identical spaced supports 62 from the upper ends of which are suspended swinging cradles 70 in which the part to be balanced, indicated at 256, is mounted for rotation. Each of the supports 62 consists of a base 66 and spaced uprights 68 as shown. The cradles each consist of a cross member 71 carrying a V-block 124 receiving the journals at the ends of the part to be balanced, the cross members being supported from the upper ends of the uprights 68 by means of parallel steel straps 79 as shown.

An adjustable stop 88, best shown at the left of Figure 3, is secured to each of the swinging cradles for cooperation with a stop 90 secured to the corresponding upright 68 to limit the extent of swinging movement.

I have also preferably provided adjustable resilient means for yieldingly holding each of the cradles in mid position. This means is best shown in Figure 3 and comprises coil spring 98 secured at one end to a part 92 secured centrally to the underside of the cross member 71, the other end being connected to member 102 adjustably secured in one of the uprights 68 and held by lock nuts 104, as shown, to permit adjustment of the tension of the spring. To the other side of part 92 is secured a similar coil spring 100 having its other end secured to an adjustable block 108 provided with a guide rod 122 slidably fitting in an aperture provided in the adjacent upright 68. There is also threaded in the block 108 an adjusting member 110 having its shank slidable in an opening in the upright 68, the opening being preferably lined with a rubber bushing shown at 112. The member 110 is confined for rotation only by means of a collar 118 secured to it on one side of a supporting bracket 114 through which it passes, and on the other side by a knob 116. It will be apparent that by rotation of the knob 116 the block 108 may be moved toward or from the adjacent upright and thus increase or decrease the tension of the spring 100.

The part to be balanced is rotated by means of an electric motor 10 connected to it by a flexible shaft 254 and suitable universal joints. There is indicated at 12 a switch for starting and stopping the motor, and any desired means, such as rheostat 14, may be provided to vary its speed. The motor shaft may be provided with a hand wheel 18 equipped with a dial 20, as shown in Figure 1a, graduated in degrees, cooperating with pointer 21 fixed to the motor housing to enable the shaft to be indexed to any desired position.

As the part to be balanced is rotated in the bearings 124 it will, if unbalanced, tend to gyrate and will cause the cradles 70 to swing slightly back and forth. This movement of the cradles is employed to produce electrical impulses by which the amount and location of unbalance are determined. Obviously, this could be done by the means disclosed in Patent No. 2,329,835 granted to L. F. Hope et al. on September 1, 1943, in which the movement varies the capacity of an electric circuit; or, if desired, the movement could be employed to vary the resistance of a circuit or to generate electrical energy through the compression of a piezo-electric crystal. However, I have preferred to employ an inductive type pickup specially designed for use in a bridge circuit in order to obtain great sensitivity.

Figure 4:
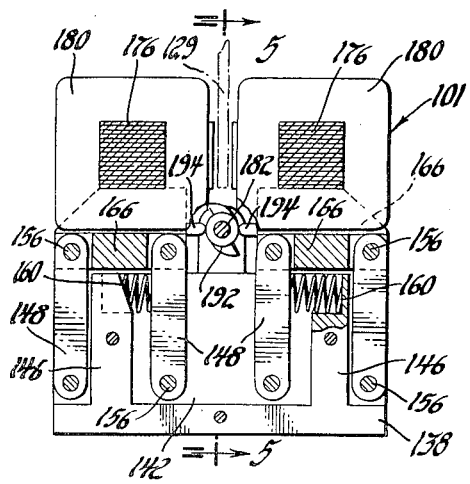
Figure 4 is a sectional view through the pickup taken on the line 4—4 of Figure 5.
Figure 5:
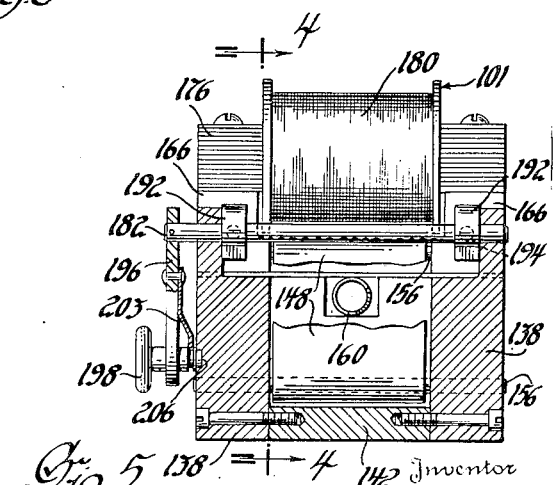
Figure 5 is a sectional view through the pickup taken on the line 5—5 of Figure 4.

The inductive pickup 101 is shown in detail in Figures 2, 4 and 5, and it will be understood that one is provided for actuation by each of the cradles 70. As best shown in Figure 2, there is secured to the adjacent end of each cradle 70 by means of suitable brackets a plate 129 preferably of soft or of other paramagnetic material. The lower end of the plate extends between the adjacent ends of two opposed, U-shaped, laminated soft iron cores 176 each having a coil 180 wound around the bottom of the U and constituting an iron core inductance. Each iron core inductance is supported on a base 166 of brass or other nonmagnetic material which in turn is supported by a pair of vertically arranged pivoted links 148, the lower ends of which are pivoted on pins 156 journaled in the end members 138 of a supporting base mounted on bracket 132 extending from one of the uprights 68. The inductances are urged toward each other by coil springs 160 bearing at one end against the inner pair of links 148 and having their other ends seated in recesses provided in the upper ends of posts 146 formed on spacer 142 secured between the uprights 138 and forming part of the supporting base.

To hold the inductances apart there is provided a shaft 182 journaled in the end members 138 and carrying cams 192 adapted to engage lugs 194 formed on the bases 166. Shaft 182 is provided with crank 196 equipped with an axially slidable spring pressed knob 198 having a reduced end adapted to snap into holes, one of which is indicated at 206, provided at one of the end members 138 to hold the shaft 182 in adjusted positions. By rotating shaft 182 the length of the air gap between the ends of the iron cores 176 may be varied as desired.

It will now be apparent that as cradles 70 swing back and forth in response to unbalance in the rotating part, each plate 129 will likewise move back and forth in the gap between the iron cores 176 and will increase the inductance of one coil 180 and reduce the inductance of the other. This variation in inductance is employed in the circuit now to be described to give an indication of unbalance.

Figure 8:
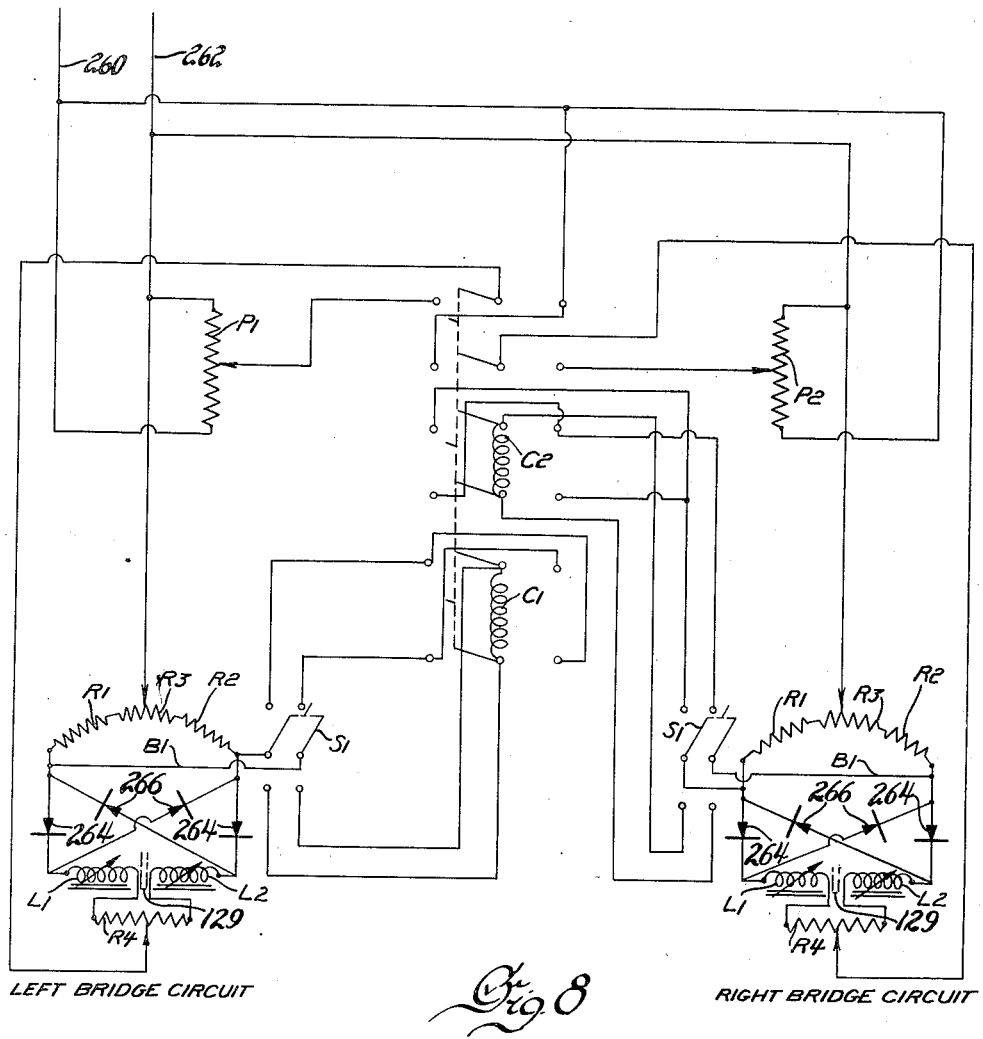
Figure 8 shows the electric circuit.

Referring now to Figure 8 there is shown at each side of the diagram a bridge circuit including the variable inductances L1 and L2 constituted by the coils 180 of one of the induction pickups. There is indicated diagrammatically the plate 129, the movement of which effects the change in inductance. The other two legs of the bridge are constituted by fixed resistances R1 and R2. The inductances L1 and L2 of each pickup are connected by a resistance R4 having an adjustable connection, as shown, with an alternating current power supply line 260 through the main switch as hereinafter described. I have found it convenient to employ a 24 volt-240 cycle source. Resistances R1 and R2 are joined by resistance R3 which is adjustably connected to the other side 262 of the power supply line. The purpose of the adjustable connections of the supply line to the resistances R3 and R4 is to permit balancing of the bridge circuit so that the effects of the alternations of the current supply can be substantially eliminated and will not appear on the indicating screen and also to permit centering of the wave on the screen.

A special feature of the bridge circuits is the provision of rectifiers 264 in series with the resistances R1 and R2 and rectifiers 266 of reversed polarity in leads connected at one end between one of the rectifiers 264 and the bridge connection and at the other end to the other side of the opposite rectifier 264. The rectifiers are preferably of the selenium type. The purpose of this arrangement is to insure that with an alternating current power supply the current through the galvanometer connected to the bridge circuit will always flow in the same direction regardless of reversal of polarity due to current alternations. Direction of current flow through the galvanometer will depend only on the relative impedances of coils L1 and L2. The relative impedances of L1 and L2 will be varied by the movement of the plate 129.

The bridge comprises leads B1 connected through a double pole double throw switch S1, as shown, to one of the coils $C_1$ or $C_2$ of the galvanometer next to be described.

The galvanometer 200, mounted in the indicator housing as shown in Figure 6, is shown in detail in Figure 7 and comprises a non-magnetic U-shaped base 208, the upper leg of which supports two L-shaped iron pole pieces 214 and 216 joined at the rear by permanent magnets 224, preferably of the aluminum-nickel-cobalt type characterized by high retentivity. While a single bar magnet may be used, I have found it preferable to employ a plurality stacked one upon the other. The assembly of magnets and pole pieces may be secured together in any desired manner as by a U-shaped stamping 220 secured to the pole pieces by bolts 222 as shown.

Secured to the inner sides of the free ends of the pole pieces is a support 226 of non-magnetic material such as brass. To this support is fixed a cylindrical soft iron member 252 extending between the ends of the pole pieces as shown but spaced therefrom to receive the galvanometer coil assembly 240 which encircles it and is spaced both from both the pole pieces and the member 252. The ends of the coil assembly 240 are provided with clips 238 of non-magnetic material connected by ribbons 234 to clips 230 and 232 secured to the top and bottom respectively of the support 226 and insulated therefrom. Hair springs 244 secured at one end to the coil assembly through clips 237 and at the other end to insulating bushings or terminals in support 226 yieldingly holding the coil assembly 240 in mid position. To the upper ribbon 234 there is secured by suitable clips a small mirror 36.

The galvanometer as described is of conventional construction except for the coil assembly 240 which is composed of two coils of wire of the same number of turns wound together, side by side, insulated from each other, and mechanically secured together as by gluing. In one embodiment of the invention each coil consisted of 146 turns of #42 wire. The coils are indicated at $C_1$ and $C_2$ on the circuit diagram. Current is supplied to one of the coils through hair springs 244 and to the other through the ribbons 234.

It will be understood that in the operation of the machine the current supplied to one of the coils $C_1$ or $C_2$ is always 180° out of phase with respect to that supplied to the other so that the resulting magnetic fields oppose each other. The amount of rotation of the coil assembly in the magnetic field existing between the pole pieces 214 and 216 is in direct proportion to the difference between the magnetic fields of the coils and therefore in direct proportion to the difference between the current supplied to them by the pickups.

It is, of course, essential that the pickups engage some concentric cylindrical surface on the body to be balanced so that they may accurately follow and measure its gyration in response to unbalance. The only convenient place to apply the pickups on most bodies is at the bearings and, hence, the position of the pickups is arbitrarily determined by the body design.

With the position of the pickups fixed by the body design the distribution of mass in an unbalanced rotating body determines the location of the nodes corresponding to unbalance existing in the selected correction planes at opposite ends of the body, and consequently determines the phase relation of the currents supplied to the coils of the galvanometer.

Thus, in the case of a short body of considerable diameter, such as a flywheel, the nodal points, corresponding to unbalance in the correction planes, fall outside the pickups with the result that the currents supplied to the galvanometer coils are in phase and assist each other instead of being in opposition. It is consequently necessary to provide means in the circuit to reverse the direction of current in one of the coils in order that the galvanometer may correctly indicate the unbalance in one correction plane.

In the case of a long body of relatively small diameter, the nodal points corresponding to unbalance in selected correction planes fall inside the pickups so that the resultant currents supplied to the galvanometer coils are 180° out of phase and no reversal of current in the circuit is required.

A body of hybrid type having a distribution of mass, similar to that obtained by joining a flywheel to a long narrow cylinder, will be found to have one of the nodal points inside the pickup and one outside. When taking readings of unbalance in the correction plane producing a nodal point outside of the pickup, it will be necessary to reverse the current in one of the coils just as in the case of a body of flywheel configuration. When taking a reading of unbalance in the correction plane at the other end of the body no reversal will be required.

In the circuit shown in Figure 8, means is provided for reversing the current flow in the galvanometer coils as called for by the configuration of the body being tested. Provision is also made in the circuit for reducing the voltage produced by the pickup at the end of the shaft at which unbalance is not being measured to an amount corresponding to the effect of unbalance existing in the correction plane at the end of the shaft not being measured upon the reading being taken at the end of the shaft at which unbalance is being measured.

The circuit can best be explained by describing its functioning in particular cases.

Let it be assumed that the body to be balanced has its mass so distributed that the nodal points corresponding to unbalance in selected correction planes lie outside of the pickups and that a reading is being taken of the unbalance in a correction plane at the left end of the body. Both switches S1 are swung to their upper position, as shown on the diagram, thereby providing for the supplying of current to the galvanometer coils $C_1$ and $C_2$ through the main switch. The main switch is moved to right closed position.

Referring first to the bridge circuit on the left of the diagram it will now be apparent that current is supplied from the power line 260 through the uppermost contacts of the main switch to the lower side of the bridge circuit and thence through that circuit to the return power line 262. The current flowing in the bridge resulting from the movement of the body in response to unbalance as registered in the left hand pickup passes from the left side of the bridge through switch S1 thence downwardly through the galvanometer coil $C_1$, returning to the other side of the bridge circuit.

Referring now to the bridge circuit at the right of the diagram it will be apparent that current is supplied from left hand power line 260 through potentiometer $P_2$ and the next-to-the-top set of contacts of the main switch, to the bottom of the bridge circuit, thence through that circuit to the return power line 262. The current flowing in the bridge resulting from the movement of the body in response to unbalance as registered in the right hand pickup passes from the left side of the bridge through switch S1 thence upwardly through galvanometer coil $C_2$, returning to the other side of the bridge circuit.

As the flow of current through the galvanometer coils $C_1$ and $C_2$ is in opposite directions the magnetic fields of the coils oppose each other and the coil assembly 240 assumes a position in the fixed magnetic field of the galvanometer determined by the resultant of the fields of the coils.

Potentiometer $P_2$ is set in the proper position by testing in the machine a perfectly balanced body to which known amounts of unbalance are applied in the correction planes so that the current supplied to coil $C_2$ is just sufficient so that the movement of the coil assembly 240 is in direct proportion to the amount of unbalance in the left hand correction plane free from any error due to unbalance existing in the right hand correction plane.

To determine the amount of unbalance in the right hand correction plane of the body, the main switch is swung to the left thereby applying full line voltage to the right hand bridge circuit and reduced voltage through potentiometer $P_1$ to the left hand bridge circuit. By tracing the circuits it will be apparent that current flows upwardly through the coil $C_1$ and downwardly through coil $C_2$. The galvanometer coil assembly 240 assumes a position determined by the resultant of the magnetic fields of the coils. The setting of potentiometer $P_1$ is likewise determined by experiment so that the amount of reduction of the strength of the magnetic field of coil $C_2$ by the field of coil $C_1$ is in direct proportion to the effect of unbalance in the left hand correction plane on the reading of unbalance obtained at the right hand pickup.

If the body to be balanced is of such configuration that the nodal points corresponding to unbalance in the selected correction planes lie inside of the pickups, switches S1 are swung to their lower position and it will be noted when in this position the direction of flow of current through coils $C_1$ and $C_2$ is not changed by shifting the main switch. In this position of parts the only effect of moving the main switch to right closed position is to apply full line voltage to the left hand bridge circuit and reduced voltage to the right hand bridge circuit while movement of the main switch to the left applies full line voltage to the right hand bridge circuit and potentiometer reduced voltage to the left hand bridge circuit. No reversing switch arrangement is required to change the direction of flow of current through the coils $C_1$ and $C_2$ because with this arrangement of the nodes the reversal takes place automatically through the character of gyration performed by the body as the result of the different distribution of mass.

If the body to be balanced is of such configuration that the right hand nodal point lies outside of the right hand pickup while the left hand nodal point lies inside the left hand pickup, to measure unbalance existing in either correction plane switch S1 for the right bridge circuit is moved to its lower closed position and switch S1 for the left bridge circuit is moved to its upper closed position, and the correct reading for either correction may be taken by moving only the main switch.

The indicating mechanism may be of any type desired. I have preferred to employ a sine wave indicator of conventional design shown diagrammatically in Figure 6. Here the source 30 projects light through an aperture in a suitable housing 32 on to the mirror 36 of the galvanometer 200 whence it is reflected on rotatable octagonal mirror 46. A telemetric motor generator set comprising a synchronous generator 21' driven from the shaft of motor 10 and a synchronous motor 42 locked in step with the generator and geared to the rotatable mirror 46 drive the mirror in step with the part to be balanced. As indicated by the dot and dash lines, the pencil of light from the source 30 striking the mirror 36 is deflected back and forth along the axis of octagonal mirror 46 as the galvanometer coil oscillates back and forth in response to unbalance. The rotating mirror spreads the light in the form of a sine wave on the screen 45. The screen may be calibrated in known manner to read vertically in crankshaft degrees and horizontally in amounts of unbalance. With this calibration any sine wave thrown upon the screen in the operation of the machine may be read in terms of the amount and angular location of unbalance.

It is believed that the operation of the machine as a whole will be clear from the foregoing. Once the machine is calibrated as described, a part to be balanced is placed in the V-blocks 124 and connected to the driving motor 10 through flexible shaft 254 and suitable couplings. The switches S1 are positioned in accordance with the distribution of mass in the body being tested, and the main switch is swung in the proper direction to obtain a reading of the amount and angular location of unbalance at one end of the shaft. The operation is repeated with the main switch swung in the opposite direction to obtain a reading of unbalance at the other end, switches S1 being shifted if the node at one end of the shaft is positioned in different relation to the pickup than at the other.

Various modifications will occur to those skilled in the art. Thus other known types of indicating instruments may be employed to receive from the pickups electrical impulses 180° out of phase with each other, and give a resultant indication corresponding to the amount of unbalance. The angular location of unbalance may, if desired, be obtained by separate arrangements known in the art.

I claim:

1. In a balancing machine, means for mounting a body-to-be-balanced for rotation while permitting it to be displaced in response to unbalance, means for rotating the body, a plurality of independent electrical circuits, means for supplying current to each of said circuits, each of said circuits comprising an unbalanced bridge circuit, electrical pickups associated with the body at spaced points along its axis, each comprising a part adapted to be actuated by displacement of the body in response to unbalance and an impedance in one of the legs of said bridge circuit adapted to be varied by actuation of said part to unbalance one of said bridge circuits, and an electro-magnetic indicating means having current-carrying actuating means comprising conductors, one in each of the bridges of said bridge circuits, adapted to give an indication determined by the resultant effect of the currents in said conductors.

2. In a balancing machine, means for mounting a body-to-be-balanced for rotation while permitting it to be displaced in response to unbalance, means for rotating the body, a plurality of independent electrical circuits, means for supplying current to each of said circuits, each of said circuits comprising a balanced bridge circuit, electrical pickups associated with the body at spaced points along its axis, each comprising a part adapted to be actuated by displacement of the body in response to unbalance and an impedance in one of the legs of said bridge circuit adapted to be varied by actuation of said part to unbalance one of said bridge circuits, an electromagnetic indicating means having current-carrying actuating means comprising conductors, one in each of the bridges of said bridge circuits, adapted to give an indication determined by the resultant effect of the currents in said conductors, and means in each of said independent circuits for selectively varying the flow of current therethrough comprising a selectively variable impedance.

3. In a balancing machine, means for mounting a body-to-be-balanced for rotation while permitting it to be displaced in response to unbalance, means for rotating the body, a plurality of independent electrical circuits, means for supplying current to each of said circuits, each of said circuits comprising a balanced bridge circuit, electrical pickups associated with the body at spaced points along its axis, each comprising a part adapted to be actuated by displacement of the body in response to unbalance and an impedance in one of the legs of said bridge circuit adapted to be varied by actuation of said part to unbalance one of said bridge circuits, an electromagnetic indicating means having current-carrying actuating means comprising conductors, one in each of the bridges of said bridge circuits adapted to give an indication determined by the resultant effect of the currents in said conductors, means in each of said independent circuits for selectively reducing the flow of current therethrough comprising a selectively variable impedance, and an operator controlled reversing switch in each of said bridge circuits for reversing the flow of current through the corresponding conductor.

DONALD R. WHITNEY.

REFERENCES CITED

The following references are of record in the file of this patent:

UNITED STATES PATENTS

| Number | Name | Date |
|---|---|---|
| 1,033,409 | Joly | July 23, 1912 |
| 1,347,316 | Akimoff | July 20, 1920 |
| 1,392,028 | Torbet | Sept. 27, 1921 |
| 1,599,922 | Rathbone | Sept. 14, 1926 |
| 1,677,378 | Albrecht | July 17, 1928 |
| 2,009,997 | Germond | Aug. 6, 1935 |
| 2,165,024 | Baker et al. | July 4, 1939 |
| 2,289,074 | Rushing et al. | July 7, 1942 |
| 2,293,371 | Van Degrift | Aug. 18, 1942 |
| 2,315,578 | Baker | Apr. 6, 1943 |
| 2,322,561 | Bevins et al. | June 22, 1943 |
| 2,328,114 | Weaver et al. | Aug. 31, 1943 |
| 2,343,383 | Martin et al. | Mar. 7, 1944 |
| 2,348,922 | Peker | May 16, 1944 |
| 2,363,303 | Ehrgott et al. | Nov. 21, 1944 |

FOREIGN PATENTS

| Number | Country | Date |
|---|---|---|
| 488,936 | Germany | Jan. 10, 1930 |